United States Patent [19]

Fosgate

[11] 3,883,832

[45] May 13, 1975

[54] SINGLE ELEMENT CONTROLLED PARALLEL-T AUDIO NETWORK

[76] Inventor: James Wayne Fosgate, 3023 E. Charles Oak Rd., Phoenix, Ariz. 85032

[22] Filed: Nov. 6, 1972

[21] Appl. No.: 304,204

[52] U.S. Cl. ................ 333/70 CR; 333/75; 333/76; 333/81 R

[51] Int. Cl. ........................... H03h 7/10; H03h 7/16

[58] Field of Search ......... 333/75, 76, 70 CR, 70 R, 333/81 R

[56] References Cited

UNITED STATES PATENTS 2,503,540 4/1950 Augustadt .......................... 333/81 X 3,794,864 2/1974 Masuda ............................ 333/75 X

OTHER PUBLICATIONS

Langford-Smith, "Radiotron Designer's Handbook," Radio Corporation of America, Harrison, N.J., 1952, TK6563L34, pages 1194–1195.

*Primary Examiner*—James W. Lawrence
*Assistant Examiner*—Marvin Nussbaum

[57] ABSTRACT

A parallel-T audio frequency notch filter utilizing an additional resistive control element which when increased in resistive value forces the parallel-T to lower its maximum attenuation position along the frequency spectrum in accordance with said resistance changes.

1 Claim, 1 Drawing Figure

SINGLE ELEMENT CONTROLLED PARALLEL-T AUDIO NETWORK

Figure 1:
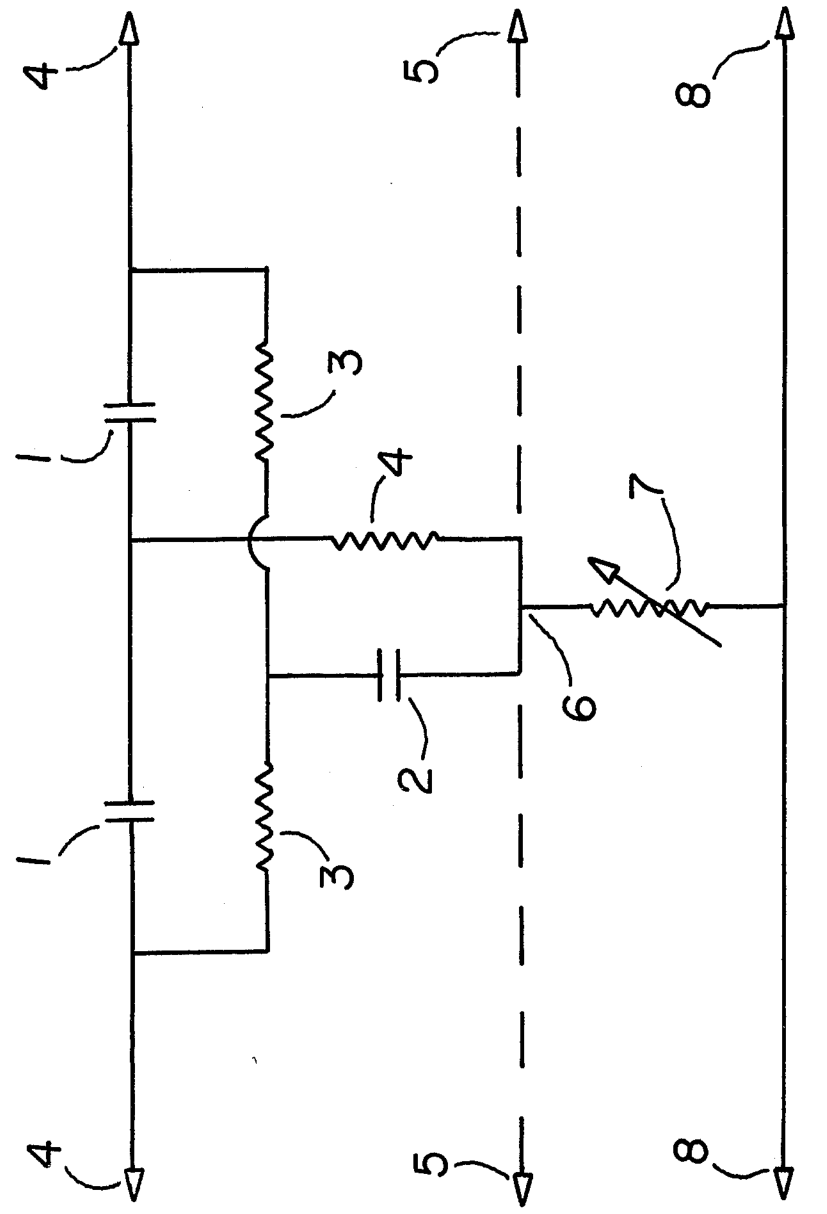

An object of the present invention is to provide an improved notch filter.

FIG. 1 is a schematic representation of a notch filter embodying the invention.

The parallel-T network included in FIG. 1, is common in the art and is comprised of capacitors 1—1 and 2, and resistors 3—3 and 4, with signal input and output being at 4–5 and 4–5, said input may be made into and out of either of the two terminals 4—4 while the third terminal junction 6 is connected to input and output equipment at 5—5. It is also common knowledge that lines 4—4 and 5—5 may be inverted with the third terminal being at the top and carrying the signal voltage, although for common conductor grounding and shielding reasons between input and output systems the parallel-T is usually used in the position shown in FIG. 1. When component values are selected for an example of say 100 Hz, those values may be 0.001 for capacitors 1—1 and 0.002 mfd for capacitor 2, and resistor values would be at 3—3, 1.59 megohm and at 4, 795,000 ohms. When a 100 Hz signal is fed into one 4–5 pair and monitored at the other 4—5 pair it will be attenuated to the maximum degree attainable with this network while other frequencies lower and higher than 100 Hz will be allowed to pass to a greater degree the further those frequencies are removed from 100 Hz.

In the past the only method by which the maximum attenuation position could be changed along the audio or other frequency spectrum with this device was to make resistors 3—3 and 4 variable or to switch other components, either capacitors or resistors or both groups into and out of the circuit. If individual variable resistors are used and the maximum attenuation frequency has to be known each variable dial has to be individually calibrated and all three have to be set at parallel calibrated position regardless, otherwise maximum filter effectiveness will not be realized. While this common parallel-T is known as a "notch" filter its attenuation is other than a notch since when scanned by an audio sweep frequency generator and displayed on the oscilloscope with components tuned to reject for example 1 Khz, the resultant envelope is a broad V of the positive half cycles from peaks to crossover line and likewise for the negative half cycles. Maximum attenuation is at the 1 Khz point with a straight line sloping away from this point in both directions toward the maximum envelope of about 5 Khz and 100 Hz.

While frequency shift of the parallel-T null point can be attained by varying several components, this is recognized by those familiar with the art to be impractical and we thus see the common parallel-T relegated to fixed null point design. My improvement which I claim as my invention provides moderate to wide nulling flexibility by use of a single additional element. In FIG. 1, I have inserted variable resistance 7 between the common point junction 6 and common line 8—8. 5—5 is eliminated. Input and output is now 4–8, 4–8. If resistance 7 is now placed at its lowest resistance or substantially shorted out, the design frequency of 100 Hz attained with the aforementioned component values would put into effect, and 100 Hz would attain maximum attenuation. If resistance 7 is now increased the maximum rejection frequency point is moved downward by the amount resistance 7 is increased. The increase of this resistance forces a concerted movement of the response of the other six parallel-T components and the frequency attenuation "notch" moves downward accordingly. Regardless of where the original maximum attenuation point is designed into the parallel-T, resistance 7 accomplishes the aforementioned reaction.

A complete picture of the in-range and out-of-range extremes is presented by choosing a 1 megohm variable resistance for 7, and a parallel-T design frequency of 1 Khz. As resistance 7 is increased the maximum attenuation point will begin to move downward toward a lower frequency. This notch movement will continue downward as resistance 7 is further increased until a frequency near 500 Hz is passed. During this downward excursion a small amount of increase is noted in the null point display, indicating a slight loss of absorption efficiency in the parallel-T of approximately 1/2 DB. As the 500 Hz null point is passed the sweep frequency pattern exhibits an increasingly marked decrease in parallel-T response as the the pinched-off bottom of the null V begins to swell toward a full flat response toward the maximum of 1 megohm of component 7. At this point it can be seen that the parallel-T has become substantially a two terminal device and passes the spectrum as would a single capacitor.

Since the user is interested only in the high null efficiency band area, the resistance 7 can be chosen to end its maximum resistance at or before gross expansion of the null point begins. A design nomograph will not be shown here of the parallel-T since those familiar with the art can easily locate such information in the literature and once having selected proper parallel-T components for the upper limit, the element 7 may be found by experiment or calculation.

My invention as coupled to the parallel-T may also be adapted to negative feedback systems whereby the maximum attenuation band may be realized in reverse thus causing an amplifier to accent or amplify the attenuation point selected along the band chosen and reduce the gain on all other frequencies. One example of this invention application is to remedy certain loudspeakers which have poor response in certain areas of the spectrum. The negative feedback principle as applied to amplification is old in the art and needs no treatment here as relates to this invention.

It will be obvious to those skilled in the art that various component values may be resorted to without departing from the spirit of the invention. Having fully described and disclosed my invention, the presently preferred thereof, in such clear and concise terms as to enable those skilled in the art to understand and practice the same,

I claim:

1. A single element controlled parallel-T network comprising: a pair of capacitors coupled together in series; a first conductor coupling said capacitors; a pair of fixed resistors coupled together in series; a second conductor coupling said resistors; a third resistor having one end thereof coupled to said first conductor between said capacitors; said third resistor having an opposite end; and a third capacitor having one side coupled to and between said pair of fixed resistors; said third capacitor having an opposite side; a third conductor coupling said opposite side of said third capacitor to said opposite end of said third resistor; and a variable resistor having one end coupled to said third conductor; said variable resistor having a second end; a first terminal coupling at said second end of said variable resistor; second and third terminal couplings at opposite sides of said first pair of capacitors from said first conductor; said fixed resistors having opposite ends from those connected to said second conductor; said last mentioned opposite ends coupled to respective ones of said second and third terminal couplings, whereby adjustment of said variable resistor may cause a change in frequency at which maximum attenuation occurs.

* * * * *